Patented Aug. 17, 1943

2,327,001

UNITED STATES PATENT OFFICE 2,327,001

PORE SURFACED FOAM RUBBER AND METHOD

John F. Schott, Mishawaka, Ind., assignor to Mishawaka Rubber and Woolen Manufacturing Company, Mishawaka, Ind., a corporation of Indiana Application July 1, 1940, Serial No. 343,431

6 Claims. (Cl. 18—53)

This invention relates to spongy or porous articles or materials made of foamed rubber latex or the like and has reference more particularly to the provision of such articles or materials with a highly porous surface.

Many articles made of foamed rubber latex, as for example those employed for washing, cleansing and similar purposes, require a surface which is quite porous so that liquid may penetrate readily therethrough into the interior of the spongy rubber mass and exude freely therefrom in the washing or cleansing operation.

Heretofore the surfaces normally formed on such articles are insufficiently porous and it has been necessary to remove the surface structure to expose the pores or interstices of the spongy mass and thus provide a surface of the required porosity. This not only is a tedious operation entailing objectionable labor expense, but there is also considerable wastage of material.

The principal objects of my invention are to provide articles or materials of foamed rubber latex or the like with an improved highly porous surface; to provide a simple and convenient method of producing a surface of high porosity on such articles or materials; and to avoid the trouble and expense heretofore experienced in providing such articles with a surface of sufficient porosity.

In making article or materials in accordance with the present invention, a foamed aqueous dispersion of rubber or rubber like material is employed, such as foamed rubber latex which is extensively used at present and commonly prepared either by whipping the compounded latex containing a foaming agent into a foam or, as disclosed in Blair, Bradley and Schott application Serial No. 70,264 filed March 23, 1936, by stirring the compounded latex into a separately prepared foam.

Ordinarily such foamy material is merely poured into a receptacle or mold to impart to the article or material the desired shape and then permitted to set or gel after which it is vulcanized. The article or material thus produced is of light spongy texture with innumerable intercommunicating pores or interstices throughout the mass and is exceptionally well suited for washing and cleansing purposes, but in the usual methods of making such articles or materials, the surfaces thereof, even those openly exposed in the receptacle or mold, do not have sufficient porosity to permit the free passage of water therethrough to and from the interior of the mass as required for such purposes. Therefore it has been the practice heretofore in making such spongy rubber articles or materials for washing, cleansing and similar purposes, to remove the surface portions of the spongy rubber to a sufficient depth to leave open pores and interstices at the surface through which liquid may pass freely to and from the interior of the spongy mass. This removal of surface portions is of course quite objectionable on account of the labor expense and wastage of material.

I have found however, that this removal of surface portions can be avoided and ample surface porosity obtained by molding the foamed material in a receptacle or mold so that the surface requiring porosity is exposed and then, before the setting or gelling of the material, spraying the exposed surface with water in a fine spray. Water at atmospheric temperature may be employed and the surface is uniformly sprayed but rather quickly to avoid any substantial addition of water to the material, or in other words, the water spraying is only of sufficient duration, which is readily ascertainable by experiment, to produce the porosity of surface desired.

Thereafter the material is gelled and vulcanized in the usual manner and by reason of the water spraying, the finished surface not only is highly porous but has a finished appearance and durability superior to that produced by the previous removal of non-porous surface portions.

The foamed material when poured has a bubbly texture which of course, is present at the surfaces and seemingly the water spray, either by the force of its impact or lessening of the surface tension or both, breaks the bubbles at the surface and leaves an open highly porous surface texture which is preserved throughout the gelling and vulcanization. In any event the water spraying results in a surface which is amply porous and not only serves the same purpose as the cut surfaces heretofore required in spongy rubber articles or materials for washing and cleansing purposes, but is superior thereto in some respects. Therefore by employing the present method such articles may be made utilizing the surface normally formed on the material and without the necessity of subsequently removing such normally formed surface.

In one form of cleansing article which I have been making, the foamed latex is poured into a shallow pan and the top surface smoothed off by drawing a straight edge across the top of the pan. The exposed top surface is then sprayed as above explained after which the material is permitted to gel and then vulcanized, thereby producing a relatively large layer of the spongy rubber with a highly porous top surface. This layer is then cut into sections of the required size each with a highly porous surface produced by the spraying, and this surface of the section is arranged to constitute the exposed cleansing surface of the article. Two of these sections may, for example, be secured together back to back with the sprayed porous surface facing outwardly.

In order to completely illustrate my invention and to indicate clearly to those skilled in the art the manner in which it may be practiced and the nature of the novel article produced thereby, reference may be had to the accompanying drawing in which Figure 1 is a view indicating, more or less diagrammatically, the manner in which the foam sponge may be shaped to a desired form.

Figure 2 shows, somewhat diagrammatically, the stage of spraying an exposed surface of the molded sponge for rendering the same porous.

Figure 3 is an enlarged broken section through a vulcanized foam sponge rubber product manufactured in accordance with the process of my present invention.

Referring specifically to the drawing, Figure 1 shows an initial stage of the process wherein a bubbly mass of foam sponge compound 4, which may have been prepared as previously mentioned, has been poured or introduced into a solid pan 5, shown to be substantially rectangular in shape. In order that the spongy mass may completely and homogeneously fill the container 5, sufficient of the same is poured into the container to completely fill and protrude somewhat above the top thereof. In order to provide a smooth flat surface at the top of the mass any excess, as indicated at 6, may be scraped away, and the top surface of the spongy mass smoothed off, by drawing a straight edge or doctor knife 7 across the top surface of the molded mass, as clearly seen in Figure 1.

The next stage of the process, and that comprising the essence of the invention, is seen in Figure 2 wherein there will be observed the mold pan or container 5 with its content of foam sponge compound 4, which is as yet unvulcanized and preferably ungelled. In this state of the procedure fine liquid or water sprays 8 are projected upon the exposed surface of the spongy mass 4 from suitable distributor nozzles or spraying devices 9. While two of the spraying devices are shown in the figure, it is obvious that one or more than two may be utilized according to the size of the molded mass and the desires of the operator. As clearly explained hereinbefore this liquid spray indicated at 8 is of quite short duration so as not to add any considerable amount of moisture to the spongy mass. This treatment results in a condition which carries through a subsequent vulcanization treatment and leaves the sprayed surface quite porous, as previously explained.

After the spraying treatment seen in Figure 2 the molded mass is then allowed to gel and is cured or vulcanized by a suitable heat treatment well known in the art.

The novel product of the present invention is shown in an enlarged manner in Figure 3 which illustrates the completed sponge rubber article after molding, liquid spraying an exposed surface, and vulcanizing. The vulcanized sponge rubber mass 10 contains minute pores or cells completely therethroughout, but the surfaces which have been in contact with the mold walls are found to have a relatively impervious skin or film indicated at 11. On the other hand the upper surface 12 of this product will be observed to lack the impervious skin and to be formed with many small cells which are open and communicate with the exterior at the surface 12, due to the fact that this surface has been subjected to the liquid spray operation of the present invention.

While I have described my invention in a preferred form and explained its usefulness in connection with articles or materials for washing or cleansing purposes, it is to be understood that the invention is not limited thereto but may be used in connection with any articles or materials requiring a greater surface porosity than that normally formed on the spongy material and that various changes and modifications may be made without departing from the spirit of my invention, the scope of which is to be determined by the appended claims.

I claim as my invention:

1. The method of producing a porous surface on spongy material of foam rubber or the like, which comprises shaping the foam rubber to a desired form with a surface thereof exposed, treating the exposed surface of the foam rubber before curing with liquid in a manner to produce a porous surface, and thereafter curing the foam rubber.

2. The method of producing a porous surface on spongy material of foam rubber or the like, which comprises subjecting an exposed surface of the foam rubber after shaping to a desired form to a fluid spraying operation, and thereafter curing the foam rubber.

3. The method of producing a porous surface on spongy material of foam rubber or the like, which comprises shaping the foam rubber to a desired form subjecting an exposed surface of the shaped foam rubber to a fine water spray, and thereafter curing the foam rubber.

4. The method of producing a spongy rubber material with a porous surface, which said method comprises preparing a vulcanizable foam of an aqueous dispersion of rubber, shaping the foam in a selected form with a surface thereof exposed, then spraying the exposed surface with a fine water spray and then curing the foam.

5. The method of producing spongy rubber material which comprises preparing a vulcanizable foam of rubber latex or the like, pouring the foam into an open topped pan, then spraying the exposed surface of the poured foam with a fluid to impart porosity thereto, and then vulcanizing the foam.

6. A vulcanized foam rubber product having a porous surface produced by water spraying the foam rubber surface before vulcanization, said surface being formed with numerous cells in open communication with the exterior of the rubber product.

JOHN F. SCHOTT.

DISCLAIMER 2,327,001.—*John F. Schott*, Mishawaka, Ind. PORE SURFACED FOAM RUBBER AND METHOD. Patent dated August 17, 1943. Disclaimer filed December 7, 1944, by the assignee, *Mishawaka Rubber and Woolen Manufacturing Company*.

Hereby disclaims from claim 2 of said patent any method in which the porosity of the surface is not produced by the fluid spraying operation.

[*Official Gazette January 2, 1945.*]